US006656525B2

(12) United States Patent
Rae

(10) Patent No.: US 6,656,525 B2
(45) Date of Patent: Dec. 2, 2003

(54) BULK MATERIAL LIQUID ADDITION APPARATUS AND METHOD

(76) Inventor: Todd A. Rae, 2710 Meredith Rd., White Hall, MD (US) 21161

(*) Notice: Subject to any disclaimer, the term of this patent is extended or adjusted under 35 U.S.C. 154(b) by 0 days.

(21) Appl. No.: 09/921,997

(22) Filed: Aug. 6, 2001

(65) Prior Publication Data

US 2002/0025373 A1 Feb. 28, 2002

Related U.S. Application Data

(60) Provisional application No. 60/222,908, filed on Aug. 4, 2000.

(51) Int. Cl.[7] .............................. B05C 5/02; B05D 7/00

(52) U.S. Cl. ....................... 427/212; 427/421; 427/424; 118/303; 118/19; 118/24; 118/70; 118/320; 118/447

(58) Field of Search ................................ 427/212, 421, 427/424; 118/303, 24, 19, 23, 320, 417, 70

(56) References Cited

U.S. PATENT DOCUMENTS 4,678,424 A * 7/1987 Volk, Jr. et al. ............ 425/331
6,331,210 B1 * 12/2001 Dodd .......................... 118/24
6,485,569 B1 * 11/2002 Sarakas et al. ............. 118/303

* cited by examiner

*Primary Examiner*—Michael Barr
*Assistant Examiner*—Elena Tsoy
(74) *Attorney, Agent, or Firm*—Miles & Stockbridge P.C.; John C. Kerins

(57) ABSTRACT

Apparatus and method for applying liquid coating to pellets in a flowing feed stream are provided. An incoming bulk material feed is conditioned to produce a ribbon-like agglomerated flow pattern, and the bulk material is passed through a first spray section which coats an exposed surface of the pellets flowing therethrough. The flow direction is reversed in a second spray station, which operates to expose an opposite surface of the pellets, such that the second spray section coats substantially the remainder of the outer surface of the pellets.

13 Claims, 2 Drawing Sheets

FEED 102 104 106 A R $\Theta_1$ 108 112 122 118 110 R 124 114 200 126 116 B 120 128 140 130 144 142 202 132 $2x\Theta_1$ 138 136 134 146

FEED
102
104
106
R
108
$\Theta_1$
A
112
122
118
110
R
124
114
200
126
116
B
120
128
140
130
144
142
202
132
$2x\Theta_1$
138
136
134
146

BULK MATERIAL LIQUID ADDITION APPARATUS AND METHOD

CROSS REFERENCE TO RELATED APPLICATION

This application claims the benefit of the filing date of U.S. provisional application Ser. No. 60/222,908, filed Aug. 4, 2000.

BACKGROUND OF THE INVENTION

1. Field of the Invention

The present invention is directed to an apparatus and method for applying liquid coatings to pellets in a flowing feed stream.

2. Description of Related Art

A continuing need has been identified for an apparatus which is capable of applying liquid coatings, such as liquid enzymes, to pelletized feed stock, in which the pellets are completely and evenly coated, and in which the apparatus is highly reliable, with low maintenance and low cost of ownership.

Enzymes are complex molecules which are naturally found in living organisms, and are used to speed up chemical reactions. In the animal feed industry, it has been found that, by adding a small amount of commercially available liquid enzyme to pelletized animal feed, complex structures within the feed that are not normally digested are, with the aid of the enzyme, made available for digestion. This allows for the reduction and/or elimination of certain feed additives, and also provides for higher nutrient yields.

It has also been found that lower cost corn/soy feed formulations, when combined with an appropriate enzyme addition, can provide similar nutritional value to more costly feed recipes which do not employ enzymes, and thus more economical primary feed ingredients can be used, resulting in lower production costs for the equivalent feed.

The enzyme phytase has also been successfully used in the broiler feed industry to liberate phosphorous normally not extracted through the digestive process. The use of phytase in the feed effects the reduction of phosphorous in the waste, thereby reducing potential environmental issues related to the disposal of that waste, and possible runoff into streams, lakes and tidal water systems.

Liquid enzyme formulations are readily available in concentrate form, and are normally diluted with water immediately prior to application. The apparatus and method of the present invention have been developed in order to achieve an accurate, highly repeatable means to apply liquid enzyme to pelletized animal feed, while reducing the overall dosing, and while achieving the desired minimal target activity within the pelletized product. This results in a minimized use of enzyme per quantity of feed pellets processed, and an attendant cost savings. The increased accuracy and high repeatability also provides the ability to formulate more economical feed recipes by being able to better predict and define the resulting nutrient value of the feed, such that it meets preset minimum nutrient value requirements for specific animals or specific ages of animals to be fed.

SUMMARY OF THE INVENTION

The present invention provides an apparatus and method for achieving highly accurate and highly repeatable application of liquid feed enzymes and other liquid-state products, such as hot fats, to feed products in pelletized form. The apparatus and method have broader applicability to liquid addition or liquid coating of any bulk material particulate flow.

The apparatus of the present invention is a gravity driven system, using a controlled material path in conjunction with a liquid delivery control system which delivers the liquid additive or coating material with a precision gauged by processing parameters such as the bulk material mass flow, liquid mass flow, the activity level of the liquid concentrate, and the desired target activity in the bulk material. This liquid delivery control is accomplished through the use of a control algorithm based in a microprocessor controller.

The bulk material delivery and handling equipment in the present apparatus includes a top flow conditioning section which performs the function of spreading the incoming material from its discharge stream shape, such that the material is distributed across the width of the apparatus. The feed conditioning section also agitates the bulk material, which is typically in pelletized form. The bulk material flows from the top conditioning section into a liquid application section in which, again, under the influence of gravity feed, the material is presented to a liquid spray which applies the liquid coating or additive to essentially one side (the side exposed to the spray) of the individual pellets or particles. The pellets or particles are then "flipped" in being moved to a second spray applicator section such that the previously unexposed sides of the pellets or particles are, for the most part, now exposed to a second liquid spray. The previously uncoated side is thus coated at this stage, with the result that the pellets or particles exit the apparatus having an essentially uniform coating applied to the entire surface thereof.

BRIEF DESCRIPTION OF THE DRAWINGS

The above and other features of the present invention and the attendant advantages will become readily apparent to those having ordinary skill in the art, and the invention will be more easily understood from the following detailed description of the preferred embodiments taken in conjunction with the accompanying drawing.

DETAILED DESCRIPTION OF THE PREFERRED EMBODIMENT

Figure 1:
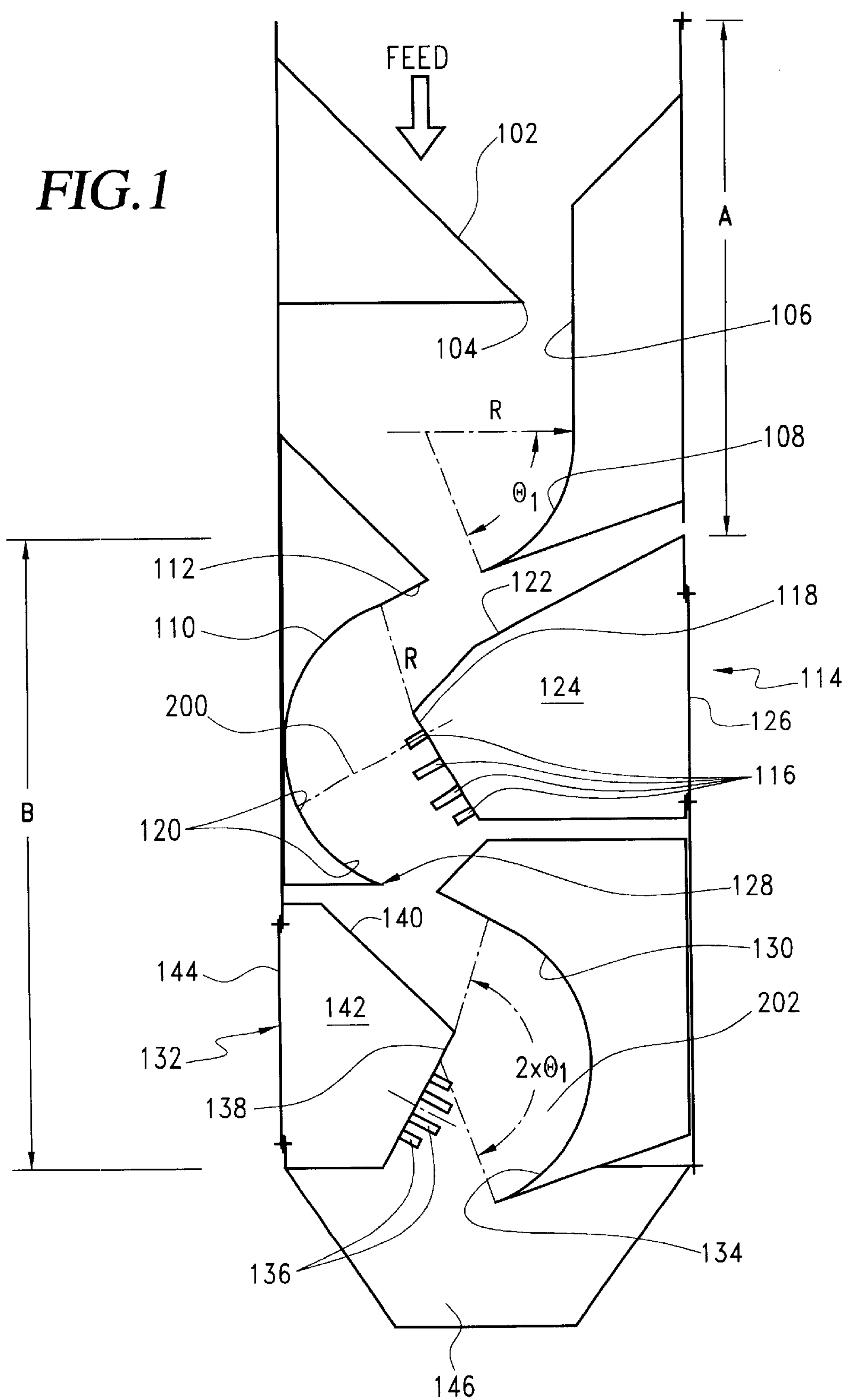
FIG. 1 is a substantially schematic cross-section of the bulk material liquid addition apparatus according to a preferred embodiment of the present application.

The apparatus 100 illustrated substantially schematically in FIG. 1 operates to continuously convey or advance free flowing solids, preferably in a pellet or particle form, via gravity, by exerting force and/or influence on the bulk material particles having mass flow energy, to flow through a predetermined course in an increased energy conversion rate zone along a curved path. The arc of increasing conversion rates extends toward the end, nesting the particles into an aggregated ribbon flow stream that produces a liquid application target area while maintaining a procession flow condition. This allows the transfer and reversal or turning over (flipping) of the flow stream to enable both sides or substantially an entire exterior surface to be treated with additive products.

In FIG. 1, section A is referred to as a flow conditioning section. In this section, the bulk material to which liquid is to be applied enters the apparatus, generally directed such that the flow will strike surface 102, and will thereby begin to spread across the width (direction into and out of the plane of the paper) of the apparatus. It is to be noted that the width of the apparatus, or the section thereof through which the material is channeled, will generally be determined principally based upon the desired flow rate capacity of the apparatus, and that, while standard widths may ultimately be selected for economical mass manufacture, the width of the apparatus need only be of sufficient size to permit the free flow of material through and across the various surfaces within the apparatus.

The bulk material flows, under the influence of gravity, down to the lower edge of surface 102, which surface is preferably a planar surface oriented at an incline to vertical, and the material exits through an opening between lower edge 104 and side wall 106 of a second subsection of the flow conditioning section. At a lower end of the second subsection, a curved wall 108 is provided, against which the particles will collect or nest into a particle bed, while also continuously moving in a downwardly direction.

The particles descend off of curved wall 108 under the influence of gravity, and enter a section B of the apparatus, which will be referred to as the liquid application section. Because a nesting or bedding of the particles is achieved at curved wall 108, the particles will flow in a substantially ribbon-like aggregation into liquid application section B.

The particles are directed by the first curved wall 108 toward a second curved wall 110, which curves in a direction opposite to or the reverse of curved wall 108. Second curved wall 110 preferably has the same or approximately the same radius of curvature R as does first curved wall 108. That radius is preferably on the order of from 4–12 inches. The leading edge section 112 of second curved wall 110 is preferably positioned such that the substantial majority of particles will flow to a lower side of the edge section 112. This desired position can be determined based upon knowing what the effects of gravity and kinetic energy will be on a particle stream for the particular configuration and size of the apparatus. Even more preferably, the leading edge section will not be curved, but will extend in a substantially planar manner from an upper edge of the curved section 110, thereby providing an upwardly deflecting service.

A first nozzle spray section 114 is disposed opposite second curved wall 110, and preferably includes a plurality of first spray nozzles 116 extending from a nozzle holder plate 118, and pointed toward a lower region 120 of second curved wall 110. The second curved wall 110 preferably sweeps through an arc of greater than 90°, and less than 180°, and more preferably on the order of about 140°. The wall 110 is oriented such that a change of direction of the particle flow is effected, wherein the initial right-to-left flow is converted to left-to-right flow (as illustrated) as the particles travel downwardly to the first liquid application station 200. The use of such a travel path for the particles enables a reconsolidation or renesting of the moving particles on this lower region 120 of the curved surface 110. As such, one side or surface of the flowing particles faces, or is presented to, the spray nozzles 116, whereupon the particles may be coated on their exposed surface by the spray from the nozzles.

First nozzle spray section 114 provides an upper surface 122 which inclines downwardly in a direction toward second curved surface 110, such that any stray particles will be directed back into the main particle stream. The nozzle spray section further defines an enclosure 124 within the apparatus, which may be closed off by an access door 126. The enclosure may be used to house the tubing and any necessary fittings (not shown) which are used to deliver liquid to spray nozzles 116.

The stream of particles continues to descend downwardly as it passes by the first set of spray nozzles 116, and leaves a lower edge 128 of second curved surface 110. The particles thereupon enter a second liquid application station 202, disposed below the first liquid application station 200, which comprises a third curved surface 130 and a second nozzle spray section 132.

Third curved surface 130 is configured substantially identically to second curved surface 110, but is oriented in the opposite direction, such that it receives the particle stream that is traveling in a left-to-right direction as it leaves lower edge 128, and, by the curvature of the surface, gradually redirects the particles into a right-to-left travel direction. In causing this redirection of particle flow, the third curved surface 130 also reconsolidates or renests (as necessary) the particles at its lower section 134, where the particles are presented to a second plurality of spray nozzles 136 mounted to a second nozzle holder plate 138.

It can be seen in viewing FIG. 1 that, as the particles leave edge 128 of the first liquid application station, the side or surface of the particles that had been exposed to the spray from the first plurality of spray nozzles will, in traveling to and being guided by the third curved surface 130, be the side or surface of the particles that contacts the curved surface. As such, the previously unexposed side or surface of the particles will now be the exposed side of the particles, and may thus be coated as the particle stream travels past the second plurality of spray nozzles.

The second nozzle spray section has an upper surface 140, enclosure 142 and access door 144 which perform the same functions as do upper surface 122, enclosure 124, and access door 126 in the first nozzle spray station.

The particles nest or bed on lower portions 134, and liquid is applied through the spray nozzles 136 to the exposed surface, as noted previously. The particles exit the apparatus 100 through a discharge chute 146, or other suitable means for containing a free-falling stream of particles.

It can thus be seen that, through the use of a two-stage liquid application process, in which non-moving parts are used to redirect particle flow and "flip" the particles to present opposite sides of the particles in the two stages, a simple, reliable, and economic liquid application system is provided.

Other preferred features of the apparatus of the present invention include the use of low pressure spray nozzles positioned nominally at a distance of from about four (4) to ten (10) inches from the lower portions of the respective second and third curved surfaces. The spray nozzles are also preferably oriented to spray in a substantially radial direction such that the liquid spray is in a direction substantially normal to the direction of flow of the particles.

This straightforward approach uses precision industrial components assembled with a unique low energy liquid application assembly, allowing even distribution of liquid products across a large area of the dry bulk flow stream in a short controlled gravity flow path. Low impact and low shear design minimizes any product degradation. The use of the controlled path established by the positioning of the oppositely-oriented curved surfaces provides repeatable and uniform target areas for the application of liquid feed additives via conventional spray nozzle arrays, and does not require a mixing chamber or mixing auger for distribution and/or absorption. The apparatus avoids the use of air atomizing nozzles, which do not generally provide acceptable performance due to the high percentage of spray droplets that become suspended in air, and the possible evaporation affects on their water-based carrier.

In a preferred embodiment, the apparatus is used as a hot fats spraying systems for a feed mills, and the apparatus can apply the hot fats liquid product separate from and after the application of heat sensitive products such as enzymes to avoid any degradation of the activity level of the enzymes. This unique design seals in the enzyme with a hot fat coating thus reducing the possibility of loss during material handling and delivery. Packaged spraying systems of this type have been designed with reliability in mind and have a targeted accuracy within 1% of the target ratio per run and an average CV of 5%, independent of feed material density variations.

The totally enclosed compact liquid application apparatus allows for easy retrofit of existing feed mills by providing a low height and small plan area modular installation approach. A standard control package provides easily read process flow graphics, measured variables, on-screen alarms and report capabilities which can also be made available remotely through a modem connection. Reliable, high accuracy, field-proven measurement equipment provides bulk material accountability of feed production, enzyme concentrate and hot fat addition to within ±0.5% or better.

Figure 2:
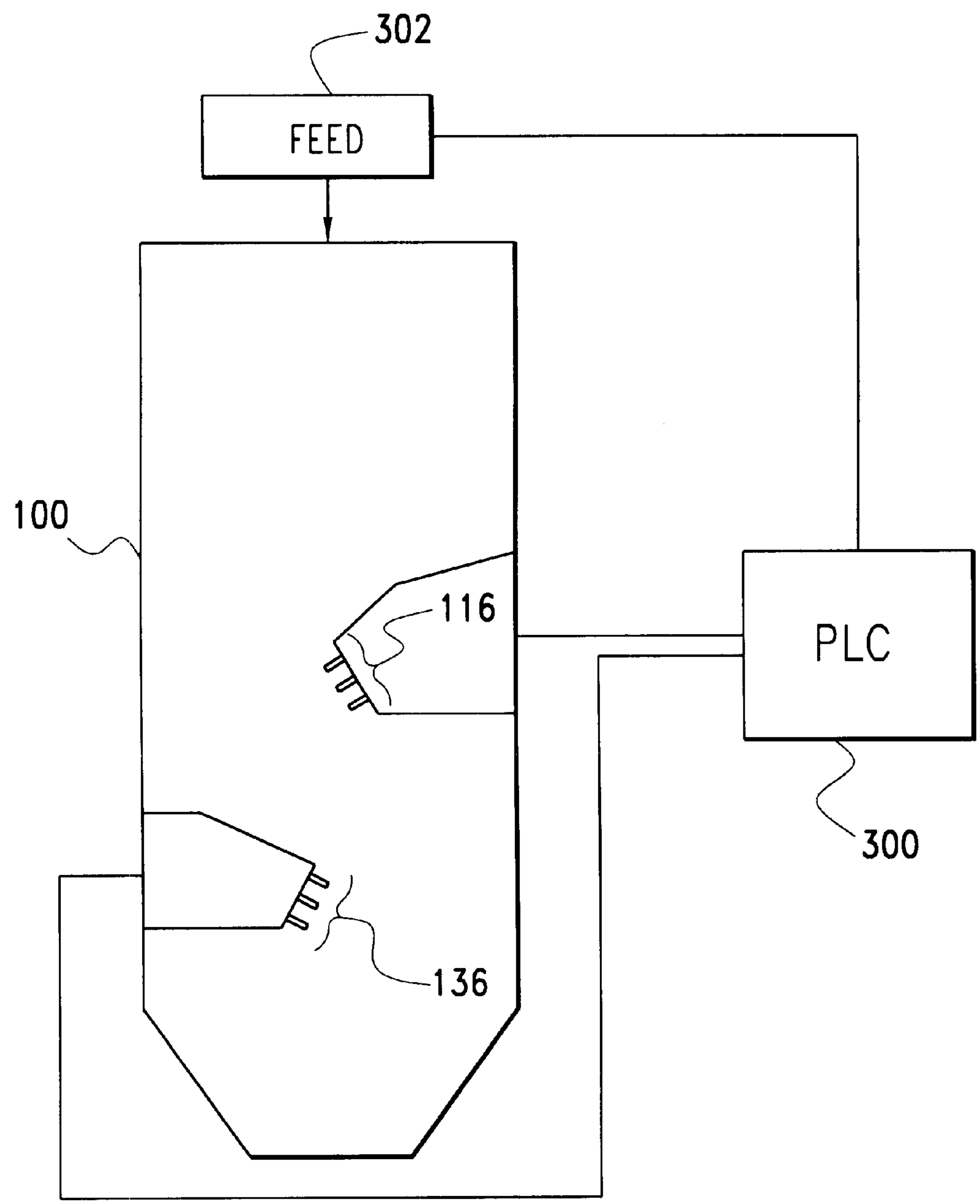
FIG. 2 is a schematic diagram of the apparatus and a control system used in conjunction with the apparatus.

This bulk material liquid application apparatus assures that the correct ratios of feed enzymes/additives are applied to the measured bulk material mass flow rate resulting in enzyme concentrate savings. Calculated mass flow rates are normally inaccurate and are not acceptable in achieving the desired level of performance. A high speed programmable logic control system 300 (FIG. 2), using customized analog and digital control algorithms is preferably used to maintain proper nozzle spray patterns over a wide range. For example, with the apparatus constructed as a Broiler feed hot fats applicator, the control system may control the nozzle arrays 116, 136 (see FIG. 3) to apply fat over a range of ½% to 4% by weight. Such a hot fats spraying system for a feed mill can be designed to apply fat at higher percentages, such as 4% to 10%. The basic design also lends itself to other feed additives and micro-ingredient additions to turkey, laying hen and hog feeds.

Maintenance and cost of ownership have been significantly reduced in the preferred embodiment of the apparatus, which uses high quality measuring components requiring only a yearly maintenance checkup and validation of components operation. The use of high maintenance weigh belt feeders is avoided. The liquids are applied through precision spray nozzles into a self-cleaning, and low wear flow path providing extended intervals between servicing.

The development of the present bulk material liquid apparatus has eliminated known problems in areas that have affected the economical installation, performance, and cost of ownership of other liquid enzyme application systems. Principally, these include poor liquid application points and poor or inadequate control of the material flow stream for accurate application of the liquid(s) to the feed. The apparatus was specifically designed to address these issues and provide the highest return on capital investment.

The Bulk Material Liquid Application (BMLA) assembly has an innovative design using gravity in a controlled material path in conjunction with a unique liquid delivery control system. The programmable logic controller system uses conventional spray nozzles to maintain the liquid spray distribution within limits for varying enzyme delivery rates due to changes in product density, variations in production or processing rate, and the activity of enzyme concentrate at time of application. The liquid pumping systems and controls are of the highest industrial quality providing reliability, repeatability, and extended mean time between failure (MTBF).

The control methodology incorporates active process variables as inputs into the control algorithm to maintain proper dose and distribution, here in described, using high accuracy measurements of bulk material mass flow and liquid mass flows. The programmable logic controller (PLC) monitors these inputs (schematically illustrated in FIG. 3) and adjusts the liquid delivery system to pace the primary feed mass flow rate.

Feed is delivered to a surge hopper from which it is metered through the solids' mass flow meter/conditioning section 302 to the apparatus. Using a custom high speed algorithm, the PLC uses the controlled solids mass flow rate to set the enzyme concentrate mass flow rate through a variable speed precision pump and liquid mass flow meter control loop. The actual delivery rate is to be based upon the concentrate activity (5,000 FTU/Gram—Default) and the target activity desired in the test sample. Since enzymes degrade with respect to time and temperature, most suppliers provide an initial concentrate activity above 5,000 FTU/gram. The control system also allows the mill operators to enter the actual delivered concentrate activity value as verified by a certified lab into the system, thus maximizing the efficiency of use of the concentrate to the feed. The water dilution rate is automatically set and trimmed to maintain the proper spray pattern for the measured mass flow.

The innovative design of the apparatus, combined including the use of conventional spray nozzles operating at low pressures and using a custom control algorithm containing actual spray system delivery performance data tables, provides desired number of droplets/ton of feed required to evenly disperse the enzyme while maintaining nozzle array spray patterns within limits. This control scheme preferably includes sequencing spray nozzles to cover large mass flow rate variations. A minimum nozzle-to-target distance, nominally 4 to 10 inches, allows the system to control the droplet impingement on the material to precise limits, avoiding drifting of enzyme, which may attach to dust particles or to the material handling equipment surfaces. The use of a totally sealed assembly also eliminates the need for an exhaust/dust collection system.

This simple and effective liquid application system, when compared to existing systems with nominal performance accuracies has alleviated the following areas of concern: maintaining repeatable liquid application target areas from the start up throughout the feed production operating range, through to shut down; maintaining a repeatable uniform liquid spray delivery system minimizing under/over application of liquid additive(s); and eliminating the need for the use of a mixing chamber or a mixing auger downstream of the application point. The design gently turns over the flow stream for the treatment of both sides with additives, thereby minimizing degradation of the product. Problems with build up on chambers/mixers where solutions are normally thrown or sprayed together into area are eliminated in this design, as are, rotating parts that directly effect long term performance without continuous maintenance in the bulk solids flow stream.

What is claimed is:

1. A method for applying a liquid coating to a flowing bulk material feed stream, comprising:

conditioning an incoming bulk material feed stream to produce a substantially ribbon-like aggregation flow pattern;

introducing said conditioned bulk material feed stream traveling in a first direction into a first spray section having a first concave wall surface which reverses a flow direction to a second direction opposite said first direction;

applying, in said first spray section, a liquid coating to an exposed surface of said bulk material feed stream;

directing said bulk material feed stream from said first spray section into a second spray section having a second concave wall surface being concave in a direction opposite that of said first concave wall section, reversing, on said second wall surface, said flow direction to said first direction, applying, in said second spray section, a liquid coating to an exposed surface of said bulk material feed stream.

2. A method as recited in claim 1, wherein said first and said second concave wall surfaces are so constructed and arranged to expose opposite sides of said bulk material feed stream to said liquid coating in said first spray section and in said second spray section.

3. A method as recited in claim 1, wherein said conditioning of said incoming bulk material feed comprises introducing said bulk material feed stream onto a downwardly inclined surface to spread said bulk material and to direct said bulk material in said second direction, and thereafter passing said bulk material over a curved guide surface to reverse the direction of bulk material flow to said first direction, prior to introducing said bulk material into said first spray station.

4. A method as recited in claim 1, wherein said liquid coating is applied by spraying a liquid under pressure onto said bulk material traveling past spray means in said first spray section and in said second spray section.

5. A method as recited in claim 1, further comprising discharging said bulk material after said bulk material exits said second spray section.

6. A method as recited in claim 1, wherein said bulk material feed stream comprises a pelletized bulk material comprising a plurality of pellets.

7. A method as recited in claim 6, wherein said first and said second concave wall surfaces are so constructed and arranged to expose opposite sides of said pellets to said liquid coating in said first spray section and in said second spray section.

8. A method as recited in claim 6, wherein said conditioning of said incoming pelletized bulk material feed comprises introducing said bulk material feed onto a downwardly inclined surface to spread said bulk material and to direct said bulk material in said second direction, and thereafter passing said bulk material over a curved guide surface to reverse the direction of bulk material flow to said first direction, prior to introducing said bulk material into said first spray station.

9. A method as recited in claim 6, wherein said liquid coating is applied by spraying a liquid under pressure onto said bulk material traveling past spray means in said first spray section and in said second spray section.

10. A method as recited in claim 6, further comprising discharging said bulk material after said bulk material exits said second spray section.

11. A method as recited in claim 1, wherein said application of said liquid coating in said first and said second spray sections provides a uniform distribution of said liquid on said bulk material feed stream.

12. A method as recited in claim 11, wherein said application of said liquid coating in said first and said second spray sections is conducted at a substantially constant flow rate.

13. A method as recited in claim 1, wherein said liquid applied in said first spray section is an enzyme coating, and wherein said liquid applied in said second spray section is a hot fats liquid product.

* * * * *